United States Patent [19]

Kreuter

[11] Patent Number: 5,758,615
[45] Date of Patent: Jun. 2, 1998

[54] ARRANGEMENT FOR VIBRATION COMPENSATION IN A RECIPROCATING-PISTON INTERNAL-COMBUSTION ENGINE

[75] Inventor: Peter Kreuter, Aachen, Germany

[73] Assignee: Meta Motoren-und-Energie-Technik GmbH, Herzogenrath, Germany

[21] Appl. No.: 730,240

[22] Filed: Oct. 15, 1996

[30] Foreign Application Priority Data

Oct. 18, 1995 [DE] Germany .................. 195 38 837.2

[51] Int. Cl.$^6$ .................................. F02B 75/06
[52] U.S. Cl. ............................ 123/192.2; 74/603
[58] Field of Search ................. 123/192.2; 74/603

[56] References Cited

U.S. PATENT DOCUMENTS

| | | | |
|---|---|---|---|
| 3,112,658 | 12/1963 | Berlyn | 123/192.2 |
| 4,979,476 | 12/1990 | Islas | 123/192.2 |
| 5,131,355 | 7/1992 | Bukovics et al. | 123/192.2 |

FOREIGN PATENT DOCUMENTS

| | | |
|---|---|---|
| 41 21 647 C1 | 4/1992 | Germany . |
| 397318 | 8/1933 | United Kingdom . |

*Primary Examiner*—Noah P. Kamen
*Attorney, Agent, or Firm*—Innovation Law Group; Jacques M. Dulin; Robert F. Dennis

[57] ABSTRACT

Described is an arrangement for vibration compensation in a reciprocating-piston internal-combustion engine whose crankshaft drives a balancing shaft arranged with its axis parallel to the axis of the crankshaft and connected to at least one balancing weight which, by virtue of the rotary movement of the balancing shaft, performs a substantially linear, oscillating movement. At least one compensation weight is connected to the balancing shaft. By virtue of the rotary movement of the balancing shaft, the compensation weight performs a substantially linear, oscillating movement. A plane which contains the axis of the balancing shaft and the path of movement of the balancing weight is inclined relative to a plane which contains the axis of the balancing shaft and the path of movement of the compensation weight. The time of minimum speed of the balancing weight coincides with the time of maximum speed of the compensation weight.

21 Claims, 3 Drawing Sheets

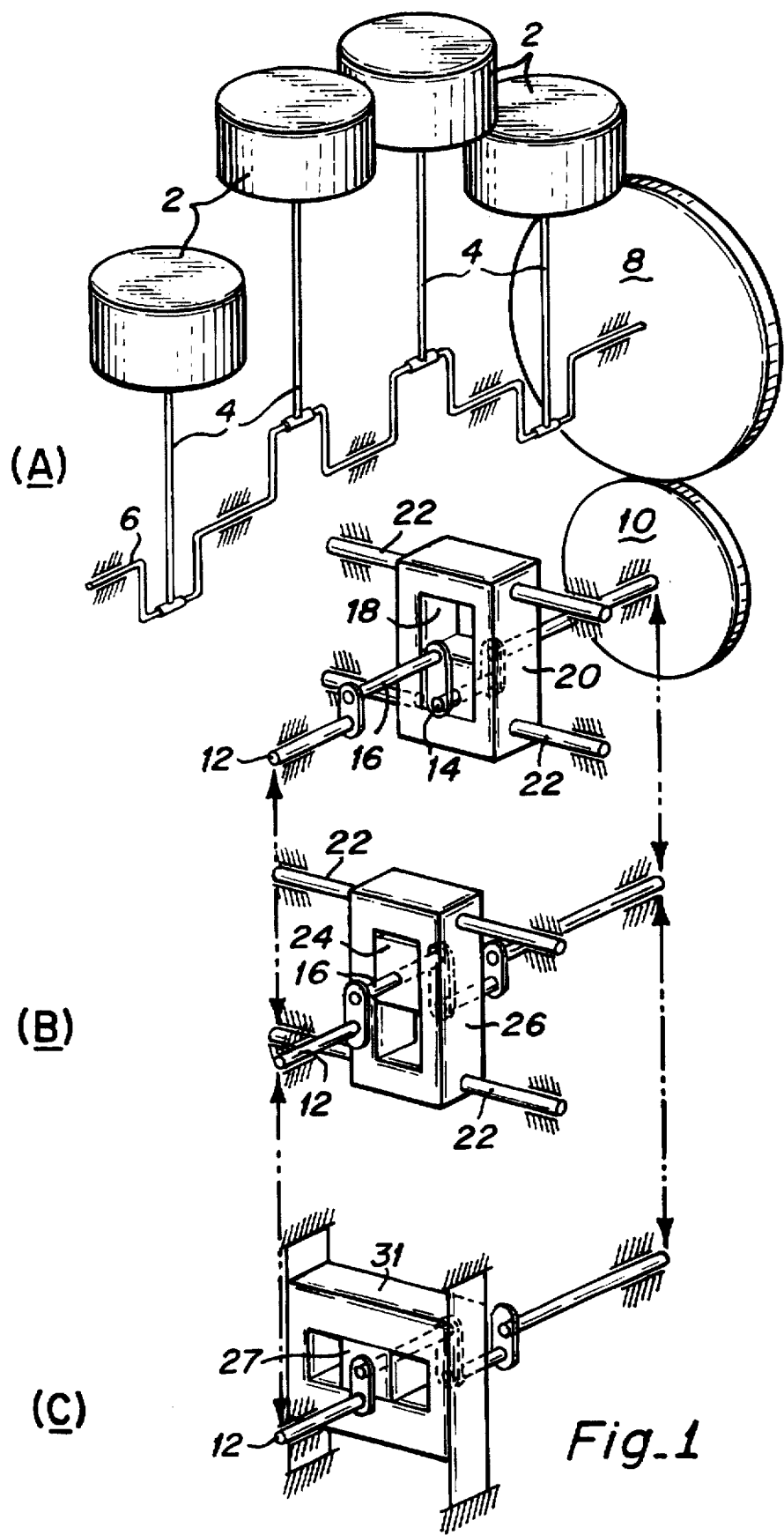
Fig._1

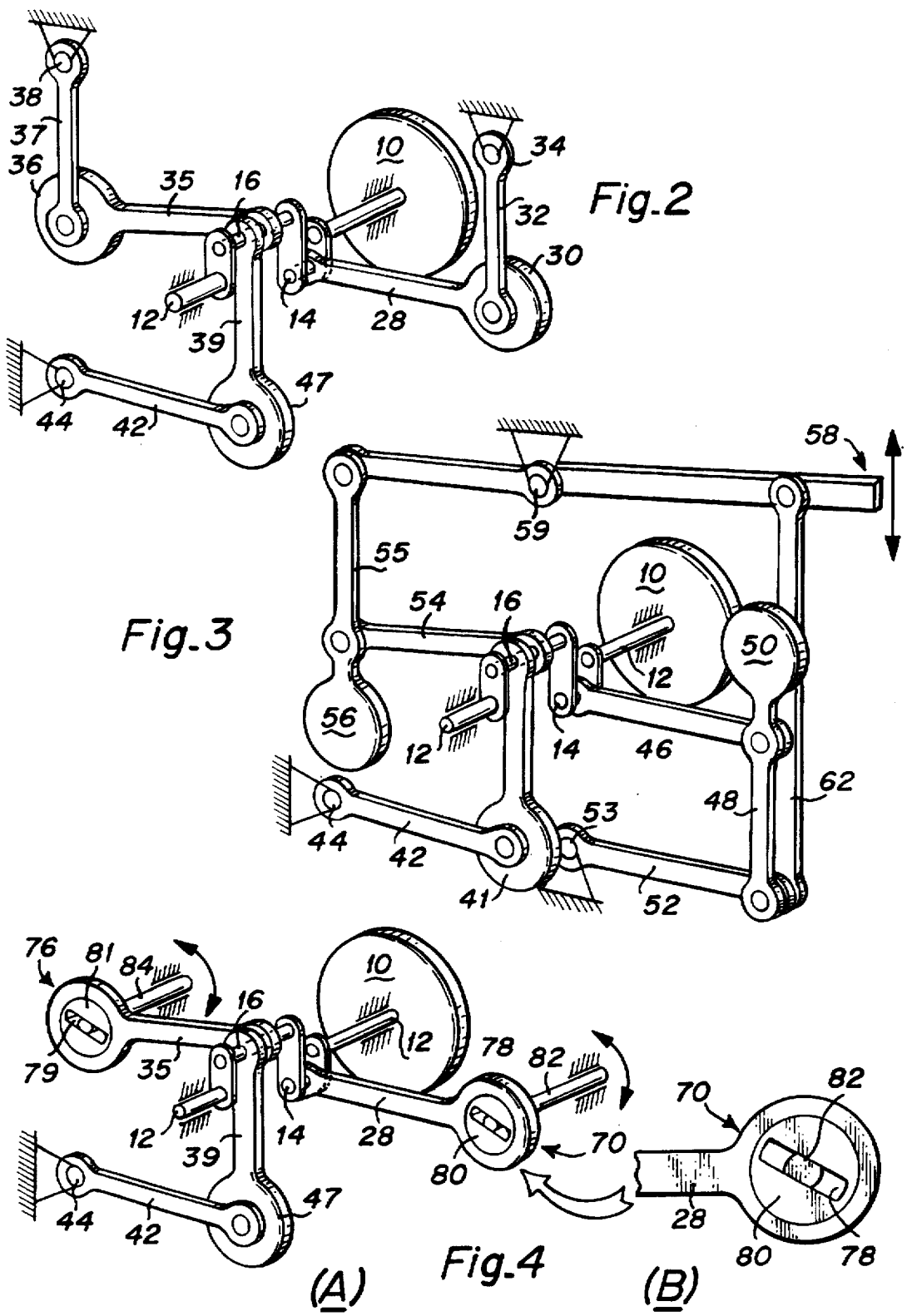

5,758,615

ARRANGEMENT FOR VIBRATION COMPENSATION IN A RECIPROCATING-PISTON INTERNAL-COMBUSTION ENGINE

FIELD OF THE INVENTION

The invention concerns an arrangement for vibration compensation for counterbalancing purposes in a reciprocating-piston internal-combustion engine.

BACKGROUND OF THE INVENTION

Compensating for vibration in reciprocating-piston internal-combustion engines (hereinafter also referred to as "reciprocating engine", "internal-combustion engine" or "engine") has become increasingly significant in recent times as internal combustion engines with a small number of cylinders have a lower rate of fuel consumption than internal combustion engines of the same capacity with more cylinders. However they are more difficult to manage in terms of their vibration characteristics.

German patent DE 41 21 647 CI discloses an arrangement for compensating for second-order inertia forces, in which a balancing shaft, by means of a crank drive, produces an oscillating movement of a linearly guided, lobe-type structural unit. A particularity of that arrangement for compensating for inertia forces is that the oscillatingly moving mass which is driven by the balancing shaft has zero kinetic energy at its respective dead center points. It also has maximum energy between the dead center points. Thus, the drive for the balancing shaft, which in DE 41 21 647 CI is a gear driven by a toothed belt, involves a considerable amount of energy interchange from the crankshaft to the counterbalancing arrangement and vice-versa. This imposes a considerable loading on the entire drive and gives rise to vibration phenomena.

SUMMARY OF THE INVENTION

An object of the present invention is to develop an arrangement for vibration compensation in an internal-combustion engine in such a way that the above-indicated problems are substantially avoided.

Another object of the present invention is to provide a vibration-compensating arrangement for a reciprocating-engine, which affords enhanced operational reliability and versatility while further providing for an improved counterbalancing effect.

In accordance with the present invention the foregoing and other objects are attained by the vibration-compensation arrangement set forth herein.

As shown in greater detail in the preferred embodiments herein, the arrangement of the invention can provide that the total energy which the balancing weight and the compensation weight have at any moment in time fluctuates substantially less than in the case of the above-discussed prior art, or is even completely constant. Thus, alternating or cyclic loadings in the drive of the balancing shaft can be considerably reduced or even entirely eliminated. The drive for the balancing shaft can thus be effected directly by way of gears. Because the planes of movement of the balancing weight and the compensation weight are inclined relative to each other, the arrangement of the invention can compensate for the inertia forces of the reciprocating engine by means of the balancing weight. By specifically making use of the movement of the compensation weight to compensate for further irregularities, such as rotary or torsional vibration phenomena, the arrangement affords additional degrees of freedom and options. An example of such use is compensating for gas force fluctuations or moments on three-cylinder engines.

It will be seen herein that the arrangement of the invention can be used for substantially all kinds of reciprocating engines. Particularly significant advantages can be achieved for reciprocating engines having four or fewer cylinders by suitable selection of the individual parameters of the counterbalancing arrangement such as the size of the weights, the amplitudes of the weights, the planes and directions of movement of the weights and so forth.

A preferred embodiment has first and second compensation weights which are adapted to move in opposite directions. This feature provides that the movement of the compensation weights does not give rise to any additional forces or moments.

A preferred feature of the invention provides that the balancing weight is connected to a crank of the balancing shaft by way of a slide member mechanism. Another preferred feature provides that, where there are first and second compensation weights, they are connected to cranks of the balancing shaft which are displaced through 180°, by way of slide member mechanisms. These embodiments of the invention afford a completely linear movement of the respective weights.

Preferably the balancing weight and the compensation weights may be connected to cranks of the balancing shaft by way of connecting rods. More especially the balancing weight and one of the compensation weights may be mounted on a common crank of the balancing shaft. The balancing weight and the compensation weights may be connected by way of pivotal mounting levers to mountings which are fixed with respect to a casing structure of the engine. These arrangements thus use drives that operate with connecting rods.

A further preferred arrangement of the invention has first and second compensation weights which move in mutually opposite directions in different planes of movement, whereby the movement of the compensation weights generates moments which can be used to compensate for vibrations of the internal-combustion engine.

Another preferred embodiment of the invention has a means with which the spacing of the planes of movement of the compensation weights is variable in dependence on at least one operating parameter of the reciprocating engine. This permits the moments produced by the movement of the compensation weights to be adapted to the respective operating conditions involved.

In a preferred arrangement of the invention the balancing shaft rotates at twice the speed of rotation of the crankshaft. This permits second-order inertial forces to be advantageously compensated.

A preferred embodiment of the invention for counterbalancing a reciprocating engine having at least one line of cylinders arranged in a row has the balancing shaft located on the side of the crankshaft that is remote from the pistons of the engine, in the plane of movement of the pistons. In the case of an engine which has two lines of cylinders arranged in a V-shape, it is preferred that the balancing shaft is located in the plane bisecting the angle between the planes of movement of the pistons, wherein the balancing weight moves in the plane which is common to the crankshaft and the balancing shaft, and the compensation weights move perpendicularly to the balancing weight. These are found to be structurally advantageous embodiments.

In a preferred arrangement of the invention in an engine with a crankshaft cooperating with three pistons arranged in a line, the balancing shaft is arranged, in the direction of movement of the pistons, on the side of the crankshaft that is remote from the pistons. The balancing shaft rotates at one and a half times the speed of rotation of the crankshaft. The balancing shaft may have first and second pairs of cranks displaced through 90°, each with cranks which are displaced through 180°. One of said pairs of cranks is connected by means of connecting rods to a respective one of first and second balancing weights which move in opposite directions approximately on a common line of action. The other pair of cranks is connected by means of connecting rods to a respective one of first and second compensation weights which move in opposite directions in planes that are spaced from each other. The balancing weights and the compensation weights may move approximately perpendicularly to the direction of movement of the pistons, while the spacing between the lines of action of the compensation weights may be variable. These features thus characterize an embodiment which, in particular, permits compensation of vibrations caused by gas force moments in three-cylinder four-stroke engines.

In a preferred feature of the invention, a gear is non-rotatably connected to the crankshaft of the engine, and meshes with a gear non-rotatably connected to the balancing shaft, thus driving the balancing shaft. This constitutes a particularly simple drive arrangement for the balancing shaft, which operates with a low level of noise because alternating loadings are substantially eliminated in accordance with the invention.

Further objects, features and advantages of the invention are described by way of example hereinafter.

BRIEF DESCRIPTION OF THE DRAWING

FIG. 1 is an overall diagrammatic view of an arrangement for vibration compensation, the components shown in Views B and C of FIG. 1 being omitted from View A of FIG. 1 for the sake of enhanced clarity of the drawing.

FIGS. 2 through 4 show further embodiments of arrangements for vibration compensation.

DESCRIPTION OF PREFERRED EMBODIMENTS

Figure 5A:
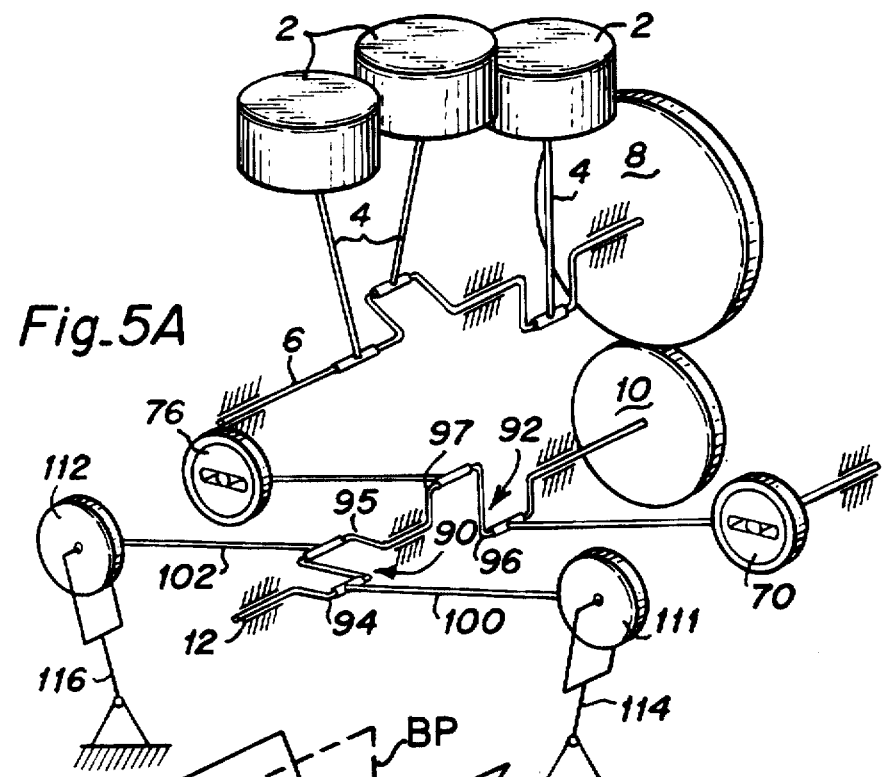
FIG. 5A shows an arrangement for vibration compensation on a three-cylinder engine.

View A of FIG. 1 shows a reciprocating engine which has four pistons 2 which are connected to a crankshaft 6 by means of connecting rods 4. Mounted non-rotatably on the crankshaft 6 is a gear 8 which meshes with a gear 10 which is non-rotatably mounted on a balancing shaft 12. The balancing shaft 12 is arranged with its axis parallel to the axis of the crankshaft 6. The numbers of teeth of the gears 8 and 10, or the diameters thereof, are selected so that the balancing shaft 12 rotates at twice the speed of rotation of the crankshaft 6.

As is further apparent from View A of FIG. 1, the balancing shaft 12 has two crank throws or cranks 14 and 16 which are displaced through 180° and which are in the same plane as the crank throws or cranks of the crankshaft 6. The crank 14 passes through a slide member 18 which, as shown in View A of FIG. 1, is guided vertically within a compensation weight 20. Compensation weight 20 in turn is horizontally movably guided on guides 22 which are fixed with respect to the engine casing (not shown). Rotation of the balancing shaft 12 thus causes a substantially linear, oscillating movement of the compensation weight 20.

The crank 16 passes through a slide member 24 which is shown in View A of FIG. 1 for the sake of clarity of the drawing and which is vertically movably guided within a further compensation weight 26. Compensation weight 26 in turn is horizontally movably guided on guides 22 which are fixed with respect to the engine casing. The compensation weight 26 thus performs a substantially linear oscillating movement upon rotation of the shaft 12.

As shown in View C of FIG. 1 the crank 16 passes through a further slide member 27 which is guided horizontally within a balancing weight 31. Balancing weight 31 in turn is guided vertically on the engine casing (not shown) and which likewise performs a substantially linear, oscillating movement in response to rotation of the balancing shaft 12.

It will be seen that a plane which contains the axis of the balancing shaft 12 and the path of movement of the balancing weight 31 is inclined relative to a plane which contains the axis of the balancing shaft 12 and the path of movement of the compensation weights 20 and 26. It will also be seen that the time of minimum speed of the balancing weight 31 coincides with the time of maximum speed of the compensation weights 20 and 26.

The above-described arrangement provides that the alternating torques at the balancing shaft 12, which are produced by the vertical oscillating movement of the balancing weight 31, are compensated by means of the compensation weights 20 and 26. The compensation weights 20 and 26 perform a movement perpendicularly to the plane of the cylinders, said compensation weights 20 and 26 being at rest when the balancing weight 31 is moving at its maximum speed, and vice-versa. This provides that the tooth engagement between the gears 8 and 10 is substantially free from alternating movements or backlash. Thus, clearances between the sides of the teeth of the gears do not make themselves disadvantageously perceptible and noise problems are eliminated.

The matching of the weights involved, the effective crank radii and the phase position of the individual movements can be so selected that the axis of the balancing shaft 12 is free from alternating moments and there are no additional free inertia forces that occur. It is preferable that the balancing weight 31 be arranged at least approximately in the center of the engine so that there are no torques around the transverse axis of the engine. The drive plane of the gears 8 and 10 should be as close as possible to a flywheel (not shown) which is non-rotatably connected to the crankshaft 6 in order to reduce the effects of rotational vibrations of the crankshaft on the engagement between the teeth of the gears.

Reference will now be made to FIG. 2 which shows a modified embodiment of the counterbalancing arrangement which operates not with slide members as in Views A, B and C of FIG. 1 but with connecting rods and pivotal mounting levers.

Mounted on the crank 14 of the balancing shaft 12 is a connecting rod 28 which is thickened at its end to form a compensation weight 30. Mounted in the compensation weight 30 is a pivotal mounting lever 32 which in turn is pivotably mounted in fixed relationship with the engine casing, at 34.

Likewise, crank 16 carries a connecting rod 35 whose end is thickened to form a compensation weight 36 carrying a further pivotal mounting lever 37 which is pivotably mounted in fixed relationship with the engine casing, at 38.

In the described assembly the compensation weights 30 and 36 move in opposite directions to each other approximately in a common plane, and thus they develop neither inertia forces nor moments.

Mounted on the crank 16 is a further connecting rod 39 which terminates in a balancing weight 41. Said balancing weight 41 is connected to a pivotal mounting lever 42 which is pivotably mounted in fixed relationship with the engine casing, at 44.

In operation, the embodiment shown in FIG. 2 corresponds to that of FIG. 1 as the balancing weight 41 performs an approximately vertical oscillating movement. It also corresponds in that the compensation weights 30 and 36 perform an approximately horizontal oscillating movement in opposite directions, that movement being in a common plane or being substantially along a common straight line. The respective patterns of movement involved can be determined by suitable selection of the lengths of the connecting rods, the lengths of the pivotal mounting levers and the magnitudes of the weights.

FIG. 3 shows an embodiment which is modified in comparison with that of FIG. 2, with which it is possible to produce tilting moments which are adjustable in magnitude, by means of the movements of the compensation weights, in order to compensate for gas force moments or rotary vibrations of the reciprocating engine. A connecting rod 46 is mounted at one end on the crank 14, and is pivotally mounted at its other end to a pivotal mounting lever 48. The free end of said pivotal mounting lever 48 terminates in a compensation weight 50. The other end of the pivotal mounting lever 48 is pivotably connected to a further pivotal mounting lever 52 which in turn is pivotably mounted in fixed relationship with the engine casing, at 53.

In an entirely similar assembly, mounted on the crank 16 is a connecting rod 54 which is pivotably connected to a pivotal mounting lever 55 which in turn terminates in a compensation weight 56. The end of the pivotal mounting lever 55 which is remote from the compensation weight 56 is pivotably connected to an end of a two-arm lever 58 which, in turn, is pivotably mounted in fixed relationship with the casing, at 59. The other end of the two-arm lever 58 is pivotably connected to a further pivotal mounting lever 62. Said pivotal mounting lever 62 is connected to the pivotable connection between the pivotal mounting lever 48 and the pivotal mounting lever 52.

As can be seen from the assembly shown in FIG. 3, when the balancing shaft 12 is rotating, the compensation weights 50 and 56 move in an approximately horizontal direction but in planes which are spaced from each other. Displacing the two-arm lever 58 in the direction indicated by the double-headed arrow causes a respective increase or reduction in the spacing of the planes of movement of the compensation weights 50 and 56, or in the difference in height of the lines of action of force thereof. The phase position between the movements of the compensation weights 50 and 56, relative to the movements of the pistons of the engine, may be so selected that the tilting moment caused by the above-mentioned difference of height can be used to at least partially compensate for the tilting moment caused by the bearing forces of the pistons against the cylinder walls with which they are supported. Since the tilting moment varies in dependence on the engine load, it is desirable that the magnitude of the tilting moment be adapted to the engine load by displacement of the lever 58. Widely varying mechanisms, such as electrical control drives and so forth, are suitable for producing the displacement of the lever 58 or adjustment of the difference in respect of height of the lines of action of force of the compensation weights 50 and 56.

FIG. 4 shows an embodiment of the invention which is modified in comparison with FIG. 2 in that this embodiment provides for the adjustment of the spacing between the lines of action along which the compensation weights 70 and 76 move and between the planes in which said compensation weights move. For this purpose each of the compensation weights 70 and 76 has a respective disk 80, 81 provided with a slot 78, 79. Each disk 80, 81 is mounted rotatably within an eye at the end of the respective connecting rod 28, 35. Engaging into each slot 78 and 79 is a suitably shaped end of a control projection shown in the form of a pin 82, 84 respectively. Said pin 82, 84 is mounted in fixed relationship with the engine casing and is rotatable in the direction indicated by the double-headed arrow by means of a suitable control device (not shown). The orientation of the slots 78 and 79 is thus determined by the preadjustable rotary position of the pins 82 and 84 respectively. Said slots are advantageously parallel to each other.

In FIG. 4, the projected plan view B illustrated at the bottom right shows a view on an enlarged scale of the compensation weight 70. If the slots 78 and 79 are oriented horizontally, the compensation weights 70 and 76 move in opposite directions in a common horizontal plane. Thus, said compensation weights move without producing a rotary vibration. The greater the amount by which the slots 78 and 79 are inclined by rotation of the pins 82 and 84, the greater is the distance between the lines of action or the planes of movement of the compensation weights 70 and 76 from each other. Thus the movement of said compensation weights in opposite directions produces an adjustable oscillation moment which serves to compensate for corresponding moments of the engine. It will be appreciated that the rotary positioning of the pins 82 and 84 can be varied according to the condition of operation of the engine.

FIG. 5A shows an arrangement according to the invention in a three-cylinder engine whose crankshaft 6 is connected to pistons 2 at each of three crank throws, which cranks are each displaced through 120°. When the engine is operated as a four-stroke engine, firing takes place in this case after a 240° rotary movement of the crankshaft 6, and this results in considerable fluctuations in rotational force. To compensate for said fluctuations in rotational force, the balancing shaft 12 is arranged with its axis parallel to the crankshaft 6, and said balancing shaft 12 is driven by the crankshaft 6 by means of the meshing gears 8 and 10 at one and a half times the speed of rotation of the crankshaft 6. Accordingly the balancing shaft performs a full revolution in each combustion cycle (240° rotary movement of the crankshaft).

The balancing shaft 12 has two pairs of cranks or crank throws 90 and 92 which are displaced through 90°. The cranks (94, 95 and 96, 97 respectively) of each pair are respectively displaced through 180°. A balancing weight 111 and 112 co-operates with cranks 94, and 95, respectively, by means of connecting rods 100, and 102. The balancing weights 111 and 112 are pivotably mounted in fixed relationship with the engine casing by way of pivotal mounting levers 114 and 116. Like the assembly shown in FIG. 4, a respective compensation weight 70 and 76 co-operates with the respective one of the other pair of cranks 96 and 97, respectively. The spacing between the lines of action of the compensation weights 70 and 76 is crucial in respect to the magnitude of vibration compensation, and is appropriately adjusted. In contrast to the other embodiments, in the embodiments shown in FIGS. 5A and 5B it is apparent that the arrangement has two balancing weights 111 and 112 which move in opposite directions in a substantially horizontal plane. Said balancing weights 111 and 112 serve to provide energy compensation with respect to the energy of the compensation weights 70 and 76.

It will be noted here that the invention can also be used for compensating for vibration on two-stroke engines.

Figure 5B:
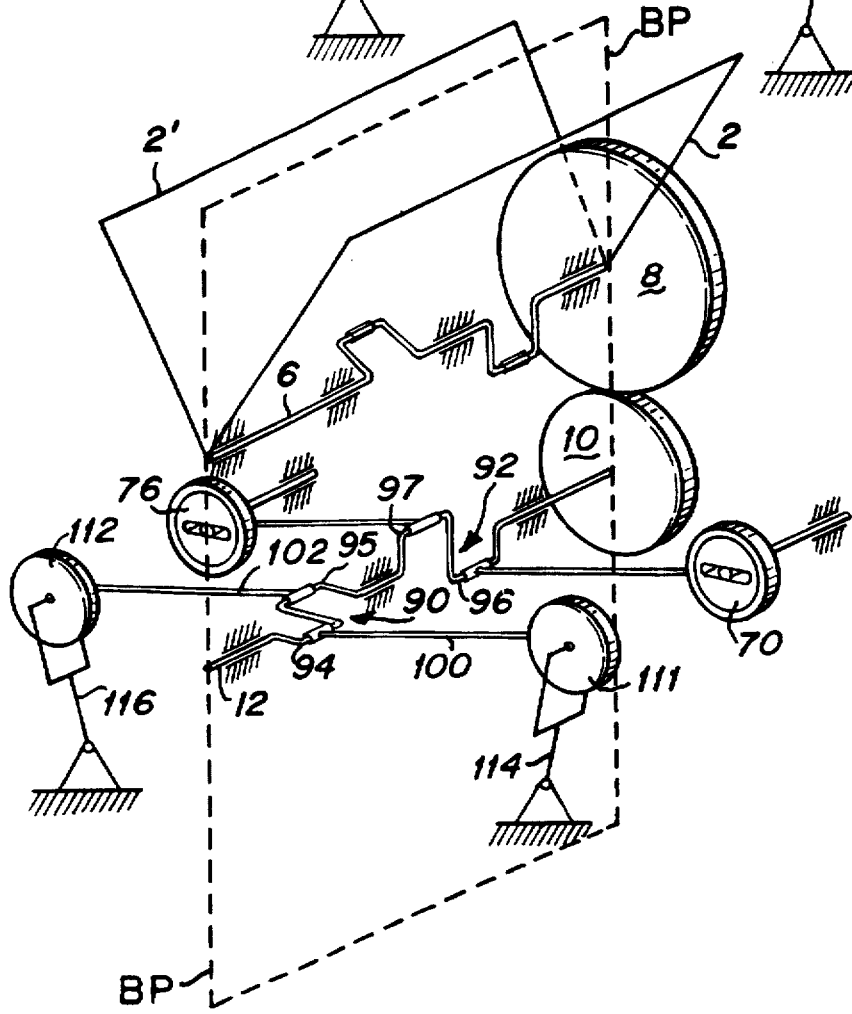
FIG. 5B shows an arrangement for vibration compensation in a two-row V-shaped engine.

For counterbalancing in a reciprocating engine having at least one line of cylinders arranged in a row, the arrangement of the invention may have the balancing shaft 12 arranged on the side of the crankshaft 6 that is remote from the pistons, in the plane of movement of the pistons. Alternatively, as shown in FIG. 5B, when the engine has two lines of cylinders arranged in a V-shape, the balancing shaft 12 may be arranged in the plane BP (dashed lines) which bisects the angle between the planes of movement of the pistons 2, 2'. The balancing weights are movable in the plane which Is common to the crankshaft 6 and the balancing shaft 12, while the compensation weights 20, 26; 30, 36; or 50, 56 are movable perpendicularly to the balancing weights.

It will be appreciated that the above-described arrangements have been set forth solely by way of example and illustration of the principles of the invention and that various modifications and alterations may be made therein without thereby departing from the spirit and scope of the invention.

What is claimed is:

1. An arrangement for vibration compensation for a reciprocating-piston internal-combustion engine having a crankshaft, comprising a balancing shaft having an axis parallel to the axis of the crankshaft, means for driving the balancing shaft from the crankshaft, at least one balancing weight, means connecting the balancing weight to the balancing shaft and operable to produce a substantially linear, oscillating movement of the balancing weight in response to the rotary movement of the balancing shaft, at least one compensation weight, and means connecting the compensation weight to the balancing shaft and operable to produce a substantially linear, oscillating movement of the compensation weight in response to the rotary movement of the balancing shaft, wherein a plane which contains the axis of the balancing shaft and the path of movement of the balancing weight is inclined relative to a plane which contains the axis of the balancing shaft and the path of movement of the compensation weight, and the time of minimum speed of the balancing weight coincides with the time of maximum speed of the compensation weight.

2. An arrangement according to claim 1 comprising first and second compensation weights adapted to move in mutually opposite directions.

3. An arrangement according to claim 1 wherein the means connecting the balancing weight to the balancing shaft includes a crank of the balancing shaft and a slide member mechanism operatively connected to the crank.

4. An arrangement according to claim 2 wherein the means connecting the compensation weights to the balancing shaft includes cranks of the balancing shaft which are displaced through 180°, and slide member mechanisms operatively connected to the respective cranks.

5. An arrangement according to claim 1 wherein the means connecting the balancing weight and the at least one compensation weight to the balancing shaft include cranks on the balancing shaft and connecting rods connected between the balancing and compensation weights and the cranks.

6. An arrangement according to claim 5 and comprising first and second compensation weights wherein the balancing weight and one of the compensation weights are mounted to a common crank of the balancing shaft.

7. An arrangement according to claim 5 comprising pivotal mounting levers for mounting the balancing weight and the at least one compensation weight to mountings which are fixed with respect to the engine casing.

8. An arrangement according to claim 6 comprising pivotal mounting levers for mounting the balancing weight and the compensation weights to mountings which are fixed with respect to the engine casing.

9. An arrangment according to claim 5 including first and second compensation weights adapted to move in mutually opposite directions in different planes of movement.

10. An arrangement according to claim 6 including first and second compensation weights adapted to move in mutually opposite directions in different planes of movement.

11. An arrangement according to claim 9 including a means with which the spacing of the planes of movement of the compensation weights is variable in dependence on at least one operating parameter of the reciprocating-piston internal-combustion engine.

12. An arrangement according to claim 10 including a means with which the spacing of the planes of movement of the compensation weights is variable in dependence on at least one operating parameter of the reciprocating-piston internal-combustion engine.

13. An arrangement according to claim 1 wherein the means for driving the balancing shaft from the crankshaft is adapted to rotate the balancing shaft at twice the speed of rotation of the crankshaft.

14. An arrangement according to claim 1 for counterbalancing purposes in a reciprocating-piston internal-combustion engine having at least one line of cylinders arranged in a row wherein the balancing shaft is arranged on the side of the crankshaft that is remote from the pistons in the plane of movement of the pistons, the balancing weight is movable in the plane which is common to the crankshaft and the balancing shaft, and the compensation weight is movable perpendicularly to the balancing weight.

15. An arrangement according to claim 1 for counterbalancing purposes in a reciprocating-piston internal-combustion engine having two lines of cylinders arranged in a V-shape, wherein the balancing shaft is arranged in a plane bisecting the angle between the planes of movement of the pistons, the balancing weight is movable in the plane which is common to the crankshaft and the balancing shaft, and the compensation weight is movable perpendicularly to the balancing weight.

16. An arrangement according to claim 1 for an engine having a crankshaft co-operating with three pistons arranged in a line, wherein the balancing shaft is arranged, in the direction of movement of the pistons, on the side of the crankshaft that is remote from the pistons, and the means for driving the balancing shaft from the crankshaft is adapted to rotate the balancing shaft at one and a half times the speed of rotation of the crankshaft.

17. An arrangement according to claim 16 wherein the balancing shaft has first and second pairs of cranks displaced through 90°, each with cranks which are displaced through 180°, and further including connecting rods connecting the one pair of cranks to a respective one of first and second balancing weights which are adapted to move in opposite directions approximately on a common line of action and connecting rods connecting the other pair of cranks to a respective one of first and second compensation weights which are adapted to move in opposite directions in planes that are spaced from each other.

18. An arrangement according to claim 17 wherein the balancing weights and the compensation weights are adapted to move approximately perpendicularly to the direction of movement of the pistons.

19. An arrangement according to claim 17 including means for varying the spacing between the lines of action of the compensation weights.

20. An arrangement according to claim 1 wherein said connecting means comprise a gear non-rotatably connected to the crankshaft and a gear non-rotatably connected to the balancing shaft and meshing with the gear on the crankshaft for driving the balancing shaft.

21. In a reciprocating-piston internal-combustion engine comprising a plurality of pistons and a crankshaft drivable in rotation by the pistons, an arrangement for vibration compensation comprising a balancing shaft having an axis parallel to the axis of the crankshaft, means for driving the balancing shaft in rotation from the crankshaft, at least one balancing weight, means connecting the balancing weight to the balancing shaft and operable to produce a substantially linear, oscillating movement of the balancing weight by virtue of the rotary movement of the balancing shaft, at least one compensation weight, means connecting the compensation weight to the balancing shaft and operable to produce a substantially linear, oscillating movement of the compensation weight by virtue of the rotary movement of the balancing shaft, wherein a plane containing said axis of the balancing shaft and the path of movement of the balancing weight is inclined relative to a plane containing said axis of the balancing shaft and the path of movement of the compensation weight, and wherein the time at which the balancing weight moves at a minimum speed coincides with the time at which the compensation weight moves at a maximum speed.

* * * * *